R. STAHL & T. H. HUNTER.
BOLT AND NUT.
APPLICATION FILED MAR. 6, 1908.
947,602.
Patented Jan. 25, 1910.
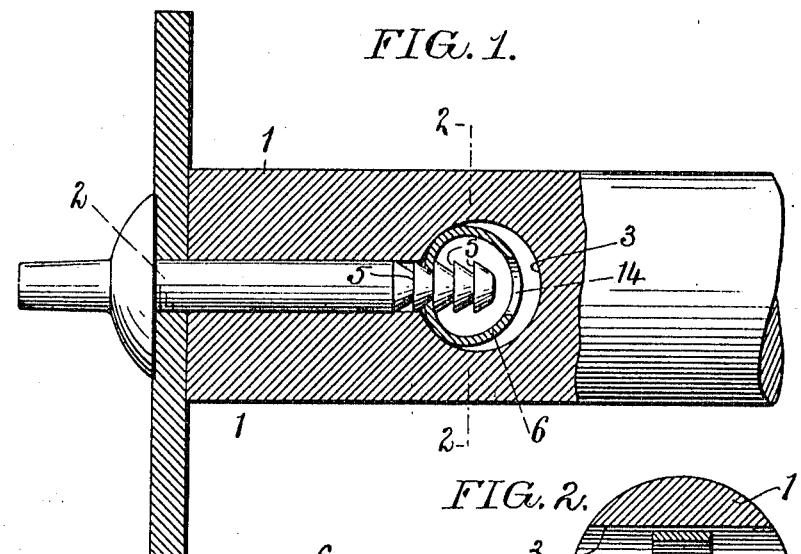
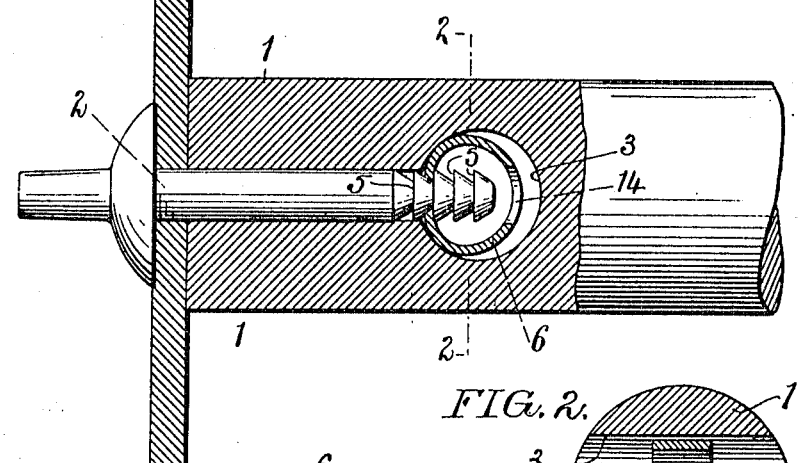
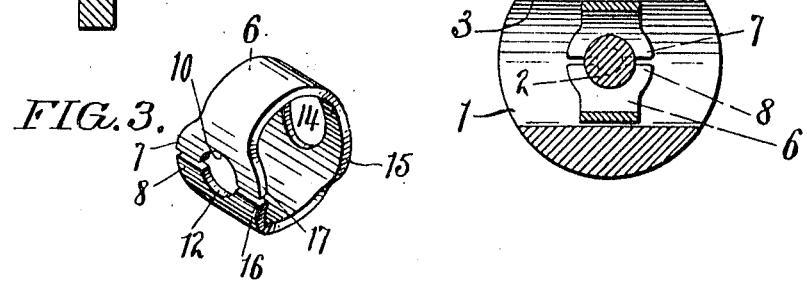
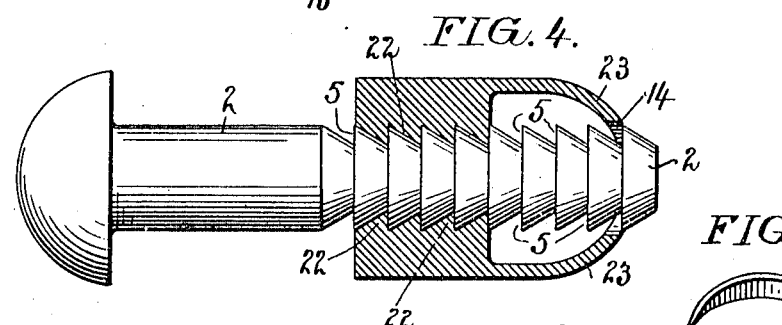
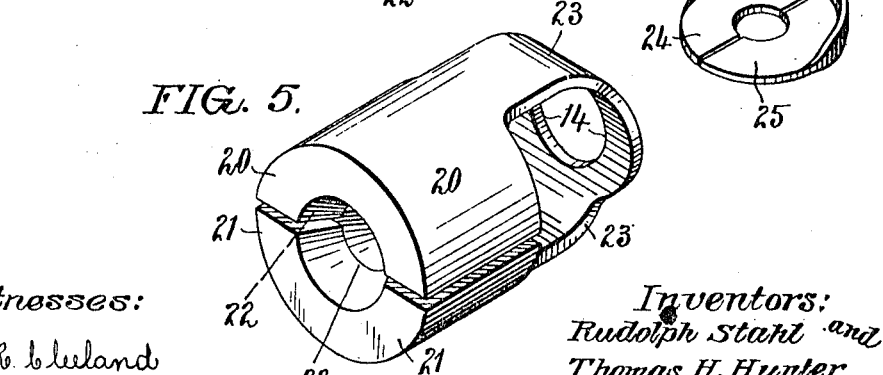
Witnesses:
M. R. Cleland
Wm. E. Rooney
Inventors:
Rudolph Stahl and
Thomas H. Hunter
By their Attorney
F. DeWitt Goodwin

UNITED STATES PATENT OFFICE.

RUDOLPH STAHL AND THOMAS H. HUNTER, OF PHILADELPHIA, PENNSYLVANIA.

BOLT AND NUT.

947,602.  Specification of Letters Patent.  Patented Jan. 25, 1910.

Application filed March 6, 1908. Serial No. 419,468.

*To all whom it may concern:*

Be it known that we, RUDOLPH STAHL, a citizen of France, and THOMAS H. HUNTER, a citizen of the United States, residing at Philadelphia, in the county of Philadelphia and State of Pennsylvania, have invented certain new and useful Improvements in Bolts and Nuts, of which the following is a specification.

Our invention relates to improvements in a bolt and a nut for the same in which the latter is self locking, and our invention particularly relates to means for securing a gudgeon in the end of a spindle or spool.

The object of our invention is to provide a bolt and nut and so lock the same together that the turning and jarring of the bolt will not loosen the nut.

A further object of our invention is to provide a self-locking nut, which is simple in operation and can be manufactured at a very low cost.

Referring to the drawings: Figure 1. is a vertical sectional view of one end of a spindle, showing a gudgeon inserted in the end thereof and secured by our improved locking means; Fig. 2. is a transverse section on line 2—2 Fig. 1; Fig. 3. is a perspective view of the nut, detached; Fig. 4. is a side view of a bolt, showing the nut in section, the parts being adapted for heavy work; Fig. 5. is a perspective view of the nut shown in Fig. 4, detached from the bolt; and Fig. 6. is a perspective view of the nut which is made in the form of a split washer, having a struck up edge to form a spring.

In the drawings 1 represents one end of the spindle, having a longitudinal aperture formed in the end thereof to receive the gudgeon 2 and said spindle also has a transverse aperture 3 formed in the cylindrical portion of the spindle and located at a point near the inner end of the gudgeon. The gudgeon or bolt 2 is provided, on its inner end, with annular recesses forming shoulders 5, the planes of which shoulders are at right angles to the longitudinal axis of the bolt or gudgeon. The said shoulders take the place of the spiral screw-threads usually cut upon bolts.

The nut 6 consists of a metal plate curved to form a cylinder. The edges or ends 7 and 8 of said plate are brought close together so that the recesses 10 and 12, formed in the said edges of said plate, will encircle the end of the gudgeon. A larger aperture 14 is also provided in the central portion of said plate, so that the end of the gudgeon, if too long, may pass through said latter opening, which is of sufficient diameter to allow the gudgeon to freely pass through the same without the shoulders on the gudgeon being engaged.

The gudgeon is applied to the spindle in the following manner: The nut is first inserted in the transverse opening 3 in the spindle and held so that the aperture formed by the recesses 10 and 12 in said plate, will be in alinement with the end of the gudgeon, when it is inserted into the longitudinal aperture formed in the end of the spindle. The gudgeon is then driven into the nut, the ends of the plate forming said nut being forced apart so that the adjacent ends of said plate will ride up over the shoulders formed on the gudgeon and then drop into place in front of said shoulder and tightly encircle the gudgeon at the smallest diameter of the latter, due to the spring in the plate forming the nut.

As shown in Fig. 1, when the nut is in place the adjacent ends of the plate forming the nut will naturally take against the vertical plane of the shoulders so that any force tending to withdraw the gudgeon from the spindle will force the edges of the nut tightly against the square shoulder 5 on the gudgeon. As the strain is exerted in such a manner as to force the edges of said nut against the square shoulder of the gudgeon, the force will not tend to open the plate forming the nut against the natural spring of said plate and the latter will only have to have sufficient spring to hold the weight of itself in place upon the end of the gudgeon.

As shown in Fig. 3, the plate forming the nut has an enlarged central portion 15, to strengthen the same at the point where the opening 14 is made in said plate. The said plate is also provided with enlarged ends 16 and 17 to strengthen the nut at the points where the edges encircle the gudgeon.

In Figs. 4 and 5 a nut is shown constructed for heavy work and in place of having a single working edge, the nut is provided with enlarged bosses 20 and 21 which have several circular teeth 22 cut therein, adapted to simultaneously engage a corresponding number of shoulders on the bolt. As shown in Fig. 5 the enlarged bosses 20 and 21 of said nut are made in two sections, which sections are held together by a spring plate 23 which acts on the said sections and tends to hold them tightly together. The said spring plate is provided with an aperture 14, of larger diameter than the bolt so that the said bolt may pass freely through the same.

Fig. 6 illustrates a different manner of constructing the nut in which the plate is in the form of a washer, divided into two sections 24 and 25. A struck up edge 26 is provided which acts as a spring and tends to hold the two sections of the washer together. This form may be used to advantage for light work where a small nut is required.

Having thus described our invention we claim and desire to secure by Letters Patent.

1. In a device of the character described, the combination of a bolt, a plurality of annular projections formed on said bolt, said projections having one face at approximately right angles to the length of said bolt, and said projections having the other surface beveled, a cylindrically curved spring plate having its end edges adjacent to each other, said end edges of said spring plate having curved recesses formed therein, said spring plate adapted to be forced over the said beveled surfaces of said projections and to embrace the said bolt and be held thereon by said projections.

2. In a device of the character described, the combination of a bolt, a plurality of annular shoulders formed upon said bolt, a cylindrically curved spring plate having its end edges adjacent to each other and adapted to engage said shoulders upon said bolt and said spring plate having an aperture formed therein of larger diameter than said bolt to allow the end of said bolt to pass through the said aperture in said spring plate.

In testimony whereof we affix our signatures in presence of two witnesses.

RUDOLPH STAHL.
THOMAS H. HUNTER.

Witnesses:
M. R. CLEELAND,
WM. L. ROONEY.